United States Patent
Yeo et al.

(10) Patent No.: US 11,310,045 B2
(45) Date of Patent: Apr. 19, 2022

(54) COMPRESSION AND OBLIVIOUS EXPANSION OF RLWE CIPHERTEXTS

(71) Applicant: Google LLC, Mountain View, CA (US)

(72) Inventors: Kevin Yeo, Jersey City, NJ (US); Asra Ali, Mountain View, CA (US); Tancrede Lepoint, Mountain View, CA (US); Sarvar Patel, Montville, NJ (US)

(73) Assignee: Google LLC, Mountain View, CA (US)

( * ) Notice: Subject to any disclaimer, the term of this patent is extended or adjusted under 35 U.S.C. 154(b) by 183 days.

(21) Appl. No.: 16/702,217

(22) Filed: Dec. 3, 2019

(65) Prior Publication Data
US 2020/0358610 A1   Nov. 12, 2020

Related U.S. Application Data

(60) Provisional application No. 62/845,793, filed on May 9, 2019.

(51) Int. Cl.
| | | |
|---|---|---|
| *H04L 9/30* | (2006.01) | |
| *G06F 16/901* | (2019.01) | |
| *H04L 9/00* | (2006.01) | |

(52) U.S. Cl.
CPC ........ *H04L 9/3026* (2013.01); *G06F 16/9027* (2019.01); *H04L 9/008* (2013.01)

(58) Field of Classification Search
CPC ..... H04L 9/0326; H04L 9/008; H04L 9/3093; G06F 16/9027
See application file for complete search history.

(56) References Cited

U.S. PATENT DOCUMENTS

| | | | |
|---|---|---|---|
| 10,075,288 B1 * | 9/2018 | Khedr | H04L 9/30 |
| 10,778,408 B1 * | 9/2020 | Khedr | H04L 9/30 |
| 2014/0177828 A1 | 6/2014 | Loftus et al. | |
| 2014/0380062 A1 * | 12/2014 | Sakumoto | H04L 9/3247 |
| | | | 713/189 |
| 2015/0067336 A1 | 3/2015 | Ding | |
| 2015/0172258 A1 * | 6/2015 | Komano | H04L 9/008 |
| | | | 380/259 |
| 2015/0318865 A1 * | 11/2015 | Rotge | H03M 7/30 |
| | | | 708/520 |
| 2016/0197726 A1 * | 7/2016 | Yasuda | H04L 9/008 |
| | | | 380/28 |

(Continued)

OTHER PUBLICATIONS

International Search report for the related application No. PCT/US2019/064334 dated Dec. 3, 2019.

*Primary Examiner* — Vu V Tran
(74) *Attorney, Agent, or Firm* — Hongman LLP; Brett A. Krueger

(57) ABSTRACT

A method includes obtaining a plaintext query that includes a sequence of plaintext integers and generating a polynomial having coefficients that include the sequence of plaintext integers of the plaintext query. The method also includes encrypting the polynomial using a secret encryption key and transmitting the encrypted polynomial to a server. The secret encryption key is randomly sampled from a ciphertext space and the server is configured to expand the encrypted polynomial using a public encryption key to obtain a sequence of encrypted integers corresponding to the sequence of plaintext integers. The method also includes receiving an encrypted result from the server. The encrypted result is based on the sequence of encrypted integers.

16 Claims, 9 Drawing Sheets

(56) References Cited

U.S. PATENT DOCUMENTS

2017/0147835 A1\* 5/2017 Bacon ................... G06F 21/602
2017/0244553 A1   8/2017 Savry et al.
2018/0212750 A1\* 7/2018 Hoffstein ................ G06F 17/16

\* cited by examiner

240

1. Set $res[0][1] \leftarrow c$.
2. For $i = 1, \ldots, \log_2(d)$:
   (a) For $j = 1, \ldots, 2^i$:
      i. Set $parent \leftarrow res[i-1][j]$.
      ii. Set $left \leftarrow parent$.
      iii. Set $right \leftarrow parent * x^{-2^i}$.
      iv. Set $res[i][j] \leftarrow Sum(pK, left(x), left(x^{\frac{N}{2^i}+1}))$.
      v. Set $res[i][j + 2^i] \leftarrow Sum(pK, right(x), right(x^{\frac{N}{2^i}+1}))$.
3. Return $\frac{res[\log_2(d)][1]}{d}, \ldots, \frac{res[\log_2(d)][d]}{d}$.

FIG. 2B

COMPRESSION AND OBLIVIOUS EXPANSION OF RLWE CIPHERTEXTS

CROSS REFERENCE TO RELATED APPLICATIONS

This U.S. patent application claims priority under 35 U.S.C. § 119(e) to U.S. Provisional Application 62/845,793, filed on May 9, 2019. The disclosure of this prior application is considered part of the disclosure of this application and is hereby incorporated by reference in its entirety.

TECHNICAL FIELD

This disclosure relates to compressing and obliviously expanding RLWE ciphertexts.

BACKGROUND

Private information retrieval (PIR) schemes allow a user to retrieve data from one or more storage devices while not revealing any knowledge about the user or the retrieved data to a server hosting the one or more storage devices. For PIR, server storage devices are generally not protected and private information is retrieved from either a public storage device or a server storage device with a group of subscribers all permitted to download data from the entire storage device. While users may simply download all of the content from a server storage device so that access patterns are not revealed, this takes too long when having to download all the contents from a cloud storage service spanning multiple storage devices. Moreover, conventional PIR schemes consume significant amount of bandwidth, especially when the user wishes to retrieve multiple blocks or entries of data from the server.

SUMMARY

One aspect of the disclosure provides a method for compressing one or more integers into an encrypted polynomial. The method includes obtaining, by data processing hardware of a user device, a plaintext query that includes a sequence of plaintext integers and generating, by the data processing hardware, a polynomial having coefficients that include the sequence of plaintext integers of the plaintext query. The method also includes encrypting, by the data processing hardware, the polynomial using a secret encryption key and transmitting the encrypted polynomial to a server in communication with the data processing hardware. The secret encryption key is randomly sampled by the data processing hardware from a ciphertext space and the server is configured to expand the encrypted polynomial using a public encryption key to obtain a sequence of encrypted integers corresponding to the sequence of plaintext integers of the plaintext query. The method also includes receiving, at the data processing hardware, an encrypted result from the server. The encrypted result is based on the sequence of encrypted integers.

Implementations of the disclosure may include one or more of the following optional features. In some implementations, the server is configured to, after expanding the encrypted polynomial using the public encryption key: calculate the encrypted result based on an untrusted data store at the server and the sequence of encrypted integers; and return the encrypted result to the user device. In these implementations, the server may be configured to calculate the encrypted result by determining an inner product of the untrusted data store and the sequence of encrypted integers. Additionally or alternatively, in these implementations, the method may also include, after receiving the encrypted result from the server, decrypting, by the data processing hardware, the encrypted result to obtain a decrypted result. Here, the decrypted result corresponds to at least one data block of the untrusted data store.

In some examples, the server is configured to expand the encrypted polynomial by generating a tree data structure, whereby the encrypted polynomial includes a root of the tree data structure. In these examples, a top row of the tree data structure includes the sequence of encrypted integers. Additionally, encrypting the polynomial may include encrypting the polynomial with a fully homomorphic encryption scheme. Each plaintext integer in the sequence of plaintext integers of the plaintext query may correspond to selection criterial for a respective data block of an untrusted data store at the server.

In some implementations, obtaining the plaintext query includes generating a randomized query that includes the sequence of plaintext integers. In these implementations, the method may also optionally include: inverting, by the data processing hardware, a selected plaintext integer from the sequence of plaintext integers of the randomized query to form a modified query; and transmitting, by the data processing hardware, the modified query to the server. Here, the selected plaintext integer associated with a respective data block of an untrusted data store the server and the server configured to: calculate an unencrypted result based on the untrusted data store the server and the modified query; and return the unencrypted result to the user device. Optionally, the method may further include, after receiving the encrypted result and the unencrypted result from the server, calculating, by the data processing hardware, a difference between the encrypted result and the unencrypted result to obtain a value for the respective data block of the untrusted data store that is associated with the selected plaintext integer from the sequence of plaintext integers of the randomized query.

Another aspect of the disclosure provides a system for compressing one or more integers into an encrypted polynomial. The system includes data processing hardware and memory hardware in communication with the data processing hardware of a user device. The memory hardware stores instructions that when executed on the data processing hardware cause the data processing hardware to perform operations that include obtaining a plaintext query that includes a sequence of plaintext integers and generating a polynomial having coefficients that include the sequence of plaintext integers of the plaintext query. The operations also includes encrypting the polynomial using a secret encryption key and transmitting the encrypted polynomial to a server in communication with the data processing hardware. The secret encryption key is randomly sampled by the data processing hardware from a ciphertext space and the server is configured to expand the encrypted polynomial using a public encryption key to obtain a sequence of encrypted integers corresponding to the sequence of plaintext integers of the plaintext query. The operations also include receiving an encrypted result from the server. The encrypted result is based on the sequence of encrypted integers.

This aspect may include one or more of the following optional features. In some implementations, the server is configured to, after expanding the encrypted polynomial using the public encryption key: calculate the encrypted result based on an untrusted data store at the server and the sequence of encrypted integers; and return the encrypted result to the user device. In these implementations, the server may be configured to calculate the encrypted result by determining an inner product of the untrusted data store and the sequence of encrypted integers. Additionally or alternatively, in these implementations, the operations may also include, after receiving the encrypted result from the server, decrypting the encrypted result to obtain a decrypted result. Here, the decrypted result corresponds to at least one data block of the untrusted data store.

In some examples, the server is configured to expand the encrypted polynomial by generating a tree data structure, whereby the encrypted polynomial includes a root of the tree data structure. In these examples, a top row of the tree data structure includes the sequence of encrypted integers. Additionally, encrypting the polynomial may include encrypting the polynomial with a fully homomorphic encryption scheme. Each plaintext integer in the sequence of plaintext integers of the plaintext query may correspond to selection criteria for a respective data block of an untrusted data store at the server.

In some implementations, obtaining the plaintext query includes generating a randomized query that includes the sequence of plaintext integers. In these implementations, the operations may also optionally include: inverting a selected plaintext integer from the sequence of plaintext integers of the randomized query to form a modified query and transmitting the modified query to the server. Here, the selected plaintext integer associated with a respective data block of an untrusted data store the server and the server configured to: calculate an unencrypted result based on the untrusted data store the server and the modified query; and return the unencrypted result to the user device. Optionally, the operations may further include, after receiving the encrypted result and the unencrypted result from the server, calculating a difference between the encrypted result and the unencrypted result to obtain a value for the respective data block of the untrusted data store that is associated with the selected plaintext integer from the sequence of plaintext integers of the randomized query.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 2B provides an example algorithm for expanding an encrypted polynomial.

Like reference symbols in the various drawings indicate like elements.

DETAILED DESCRIPTION

Figure 1:
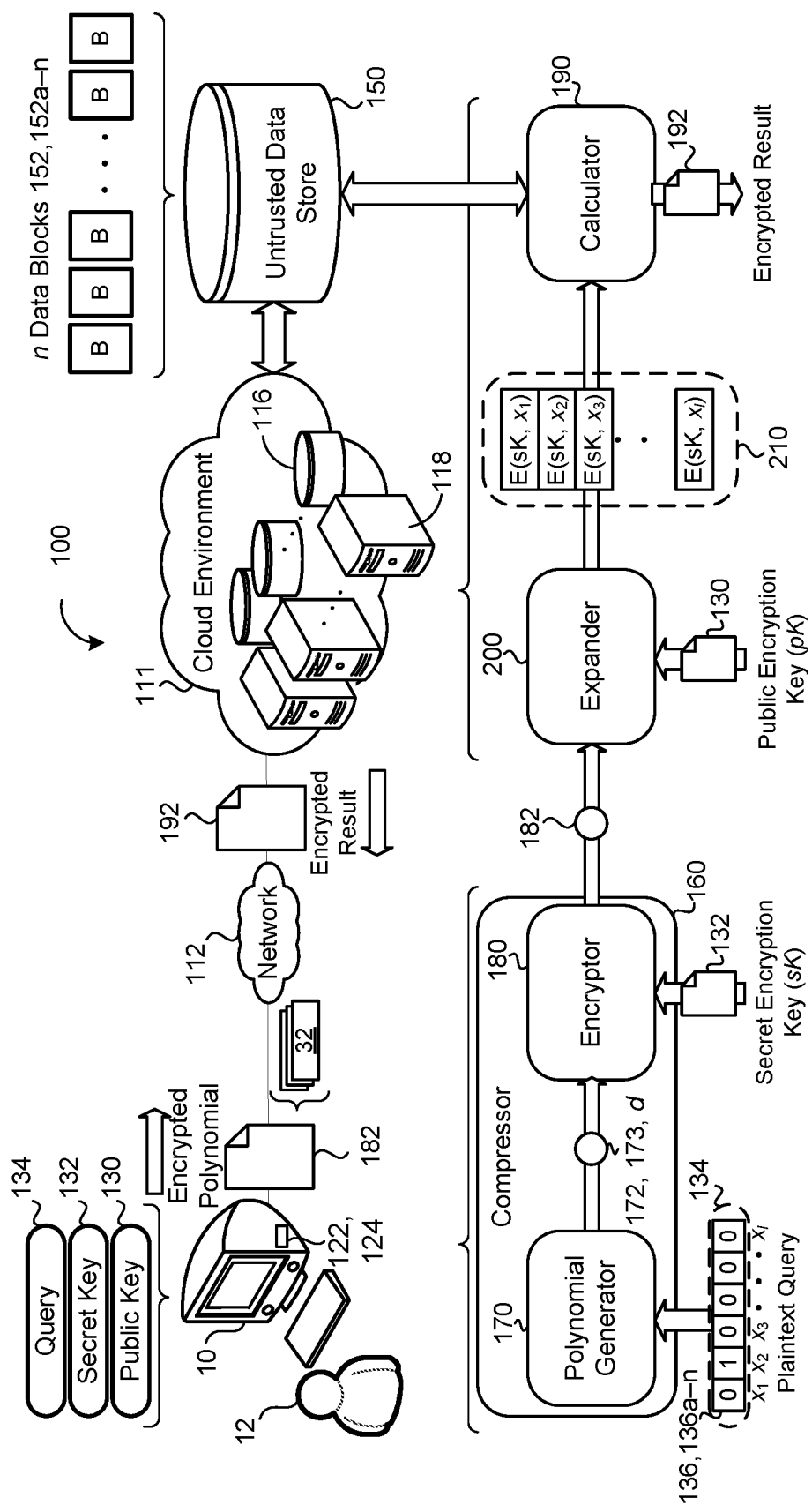
FIG. 1 is a schematic view of an example private information retrieval system that compresses and expands queries when obliviously accessing data blocks stored on non-transitory data storage of a distributed system.

Fully homomorphic encryption (FHE) is a cryptosystem with important homomorphic properties that allows untrusted parties to perform secure computation on encrypted data. That is, a user with a secret key sK, a public key pK, and some data x may wish to apply a function $f$ to retrieve $f(x)$. However, the user does not want to compute and/or does not have the computational power to apply $f$. FHE enables the user to encrypt the data under the secret key sK to generate an encryption E(sK, x). The user may then outsource the computation of $f$ on x by sending the encryption E(sK, x), the function $f$, and the public key pK to the server. The server may then compute some function $f'$ using the public key pK such that decrypting $f'$ (E(sK, x)) will result in $f(x)$. The server then simply applies $f'$ to the encryption E(sK, x) which may be sent back to the user to decrypt and retrieve $f(x)$.

In many cases, the data x is not a single value but a sequence of values $x_1, \ldots, x_l$ and the user wishes to outsource the computation $f(x_1, \ldots, x_l)$ to the server. A naive approach to outsourcing the computation is to construct l encryptions E(sK, $x_1$), . . . , E(sK, $x_l$) and send all l encryptions to the server along with the public key pK. However, because encryptions are typically quite large, this causes significant overhead in communication/network costs for both the user and the server. Therefore, it is advantageous to compress the encryptions of $x_1, \ldots, x_l$ into less than l encryptions to improve communication costs. To support such compression, the server must be able to expand the compressed encryptions back to the original l encryptions E(sK, $x_1$), . . . , E(sK, $x_l$) to be able to compute $f$ and return an encryption of $f(x)$. Furthermore, to maintain privacy, the expansion protocol for the server must remain oblivious so the server does not learn the values $x_1, \ldots, x_l$ as well as the secret key sK.

Implementations herein are directed toward a private information retrieval (PIR) routine that allows a user or client to compress one or more integers into an encrypted polynomial and allows a server, given a public key and the encrypted polynomial, to expand the encrypted polynomial to retrieve the encrypted integers without learning the plaintext values of the integers or the secret key. The routine may provide compression of more than 1000× by maximizing the usage of space and packing multiple values into the same ciphertext. The server may use the expanded encrypted integers to obliviously access data blocks stored on the untrusted data store that may be publically-known and un-encrypted (e.g., plaintext). In one example, a client using a client device may wish to access map data for a specific location without revealing the location to the server. For instance, the client may have just landed at an airport and wishes to retrieve map data for his or her surroundings privately. The PIR routine prevents the server that stores the map data from learning which data (i.e., data revealing the client's location) was retrieved by the client device. In another example, a client may wish to download a video from a server without revealing which video was downloaded. In some implementations, the PIR routine performs a portion of the calculations and communications in an offline manner (i.e., when there are less contention for resources), thereby reducing an online portion of the calculations and communications (i.e., when contention for resources is high).

Referring to FIG. 1, in some implementations, an example system 100 includes a user device 10 (also referred to as a client device 10) associated with a respective user or client 12 and in communication with a remote system 111 via a network 112. The user device 10 may correspond to any computing device, such as a desktop workstation, a laptop workstation, or a mobile device (i.e., a smart phone). The remote system 111 may be a single computer, multiple computers, or a distributed system (e.g., a cloud environment) having scalable/elastic computing resources 118 (e.g., data processing hardware) and/or storage resources 116 (e.g., memory hardware). An untrusted data store 150 is overlain on the storage resources 116 to allow scalable use of the storage resources 116 by one or more of the client or computing resources 118. The untrusted data store 150 is configured to store a plurality of data blocks 152, 152a-n.

For example, the untrusted data store 150 includes publically-known and un-encrypted n data blocks (B) 152 and allows one or more client devices 10 to use PIR for obliviously retrieving data blocks (B) 152 to conceal access patterns while preserving search functionalities on the data blocks (B) 152 by the client devices 10. Thus, the client device 10 may not own the data blocks 152 and the content of the data blocks 152 are available to the public in some configurations. Alternatively, the data blocks 152 may be private to a specific client 12, but the client 12 still desires to conceal access patterns from the untrusted data store 150. The client device 10 (e.g., a computer) associated with the client 12 may include associated memory hardware 122 and associated data processing hardware 124. Each client device 10 may leverage the associated memory hardware 122 to hold or store a public key (pK) 130 and a secret key (sK) 132, and instructions executable by the data processing hardware 124 for generating a query 134. In some examples, the data processing hardware 124 executes a compressor 160 for compressing queries 134 issued to the remote system 111, which herein may also be referred to as a server executing in an untrusted environment.

The compressor 160, in some examples, obtains or receives a plaintext query 134 that includes l integers 136 (i.e., a sequence of integers 136 of length l), where l is a number of integers 136 equal to or less than a number of data blocks n stored in the untrusted data store 150. For example, if the untrusted data store 150 includes one million data blocks 152, the query 134 will include one million integers 136 or less. In some examples, and as discussed in more detail below, the integers 136 of the query 134 indicate computation that the server 111 will conduct on the data blocks 152. That is, each integer 136 of the query 134 corresponds with a data block 152 stored on the untrusted data store 150 and the value of each integer 136 provides the server 111 with the value to compute with the corresponding data block 152. The compressor 160 also receives the secret encryption key (sK) 132. The sK 132 may be randomly sampled by the user device 10 from a ciphertext space.

The compressor 160, in some implementations, implements a polynomial generator 170 that receives the query 134 and generates an associated polynomial 172 having coefficients 173 and degree d. The coefficients 173 of the polynomial 172 include the integers 136 of the query 134. When the number l of integers 136 is less than the degree d, the missing coefficients 173 may be set to zero. By contrast, when the number l of integers 136 is greater than the degree d, the polynomial generator 170 may generate multiple separate polynomials 172 until all of the integers 136 have been included as coefficients 173. In this case, the multiple separate polynomials 172 may be combined and treated as one single combined polynomial 172. In some examples, the polynomial generator 170 uses ring learning with errors (RLWE) method to generate the polynomial 172. RLWE is learning with errors (LWE) specialized for polynomial rings over finite fields. LWE is a quantum-resistant method of cryptography that is based upon the difficulty of finding the values that solve B=A×s+e, where A and B are known. That is, LWE methods (and therefore, by extension, RLWE methods) rely on random linear equations that have been perturbed by a small amount of noise e.

In the example shown, the compressor 160 also includes an encryptor 180 that receives the polynomial 172 and the secret encryption key (sK) 132. The encryptor 180 uses the sK 132 to encrypt the polynomial 172 using, for example, a fully homomorphic encryption (FHE) scheme to generate an encrypted polynomial 182. For instance, the encryptor 180 may use a Brakerski-Gentry-Vaikuntanathan (BGV) method or a Fan-Vercauteren (FV) method. FHE is a form of encryption that allows for computation on ciphertexts that generates encrypted results that, when decrypted, matches the result of the operations as if the operations had been performed on the plaintext. Because encryption operations using FHE is affine in its inputs as plaintexts, the ciphertext may be represented as a sum of encrypted monomials multiplied by, for example, zero or one (i.e., the polynomial 172 with coefficients 173).

Thereafter, the client device 10, i.e., via the data processing hardware 124, sends the encrypted polynomial 182 to the server 111. In this way, the compressor 160 provides a compression of d encryptions into a single encryption. Typical PIR schemes require a separate selection vector for each encryption. Therefore, for example, if d is equal to 1024 or 2048, the system 100 improves communication and/or network costs by 1024 times or 2048 times, respectively, over such a traditional scheme.

With continued reference to FIG. 1, the server 111 (i.e., the remote system 111), in some implementations, executes an expander 200 that receives the encrypted polynomial 182 and the public encryption key (pK) 130. The client device 10 may provide the pK 130 when providing the encrypted polynomial 182. The expander 200, as explained in more detail below, expands the encrypted polynomial 182 to retrieve a sequence of encrypted integers 210 $E(sK, x_1), \ldots, E(sK, x_l)$ obliviously. That is, the expander 200 retrieves, from the encrypted polynomial 182, an encryption of each integer 136 of the plaintext query 134, whereby each integer 136 has been encrypted by client device 10 using the sK 132 to form the sequence of encrypted integers 210. Because the contents of the sK 132 are never revealed to the server 111, the server 111 does not ascertain or learn the plaintext values (i.e., the integers 136) associated with the sequence of encrypted integers 210.

Figure 2A:
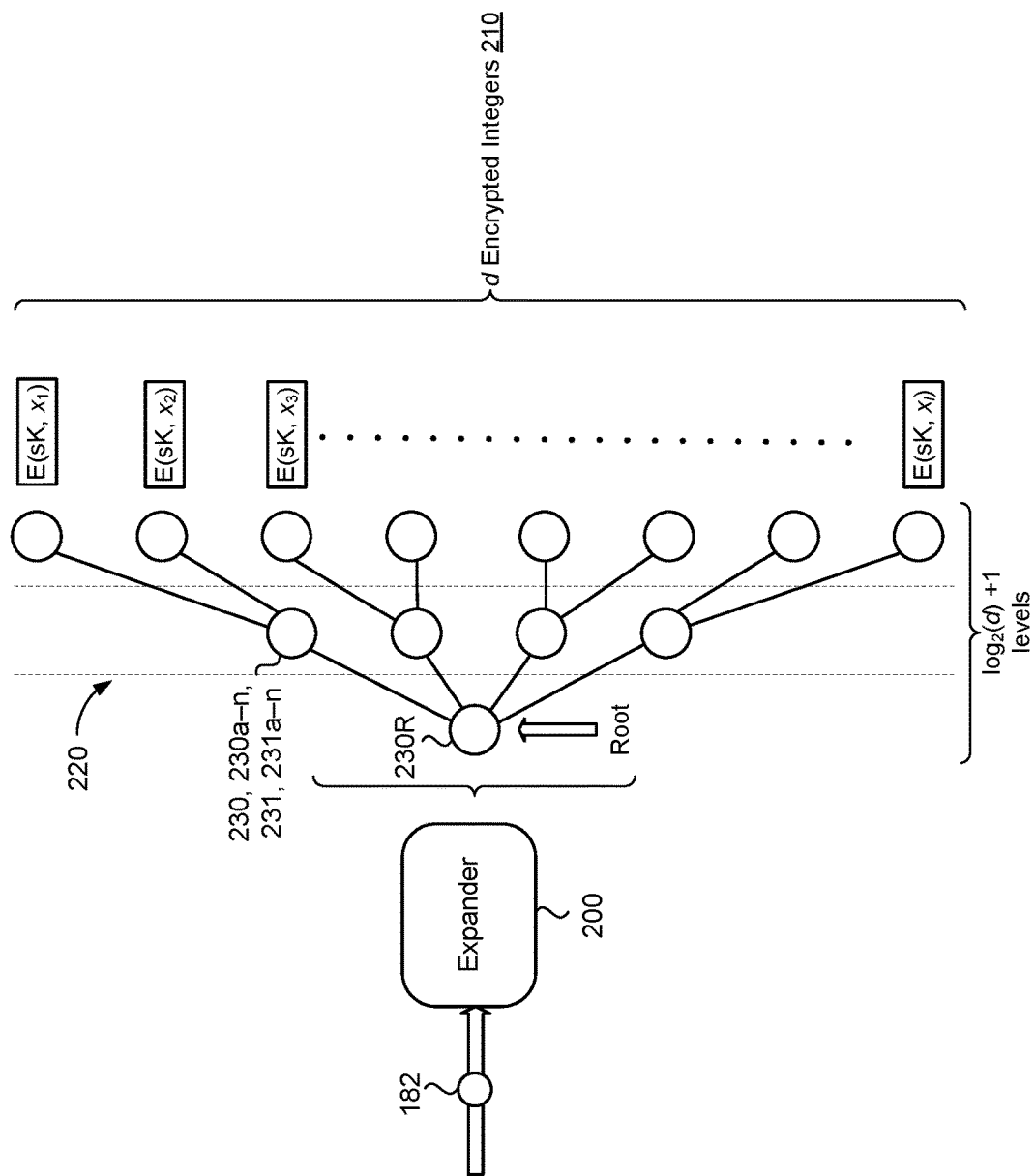
FIG. 2A is a schematic view of a tree data structure generated by an expander of the system of FIG. 1.

Referring now to FIG. 2A, optionally, the expander 200, when expanding the encrypted polynomial 182, generates a tree data structure 220 with nodes 230, 230a-n. The encrypted polynomial 182 may be set as a root 230R of the tree data structure 220. That is, the expander 200 may operate in a tree-like fashion starting from the root 230R. The height (i.e., the number of levels or rows) of the tree, in some examples, is $\log_2(d)+1$. For example, a degree d of 1024 will result in a height of ten. A "top" of the tree 220 (i.e., the final level) may include the sequence of encrypted integers 210. FIG. 2B provides an example algorithm 240 for expanding the encrypted polynomial 182 into the sequence of encrypted integers 210. In some implementations, the tree data structure 220 takes the form of a two-dimensional array res.

The array res may be populated by a first for loop with index i that refers to the level (i.e., height) of the tree data structure 220 and a second for loop with index j that iterates through all nodes 230 at level i of the tree 220 (of which there are $2^i$). Levels are indexed starting from zero, and therefore, the first level has $2^0=1$ node 230 which is the root 230R. Each node 230 of the tree 220 is associated with a corresponding value 231, 231a-n. For non-leaf nodes 230 (i.e., nodes that have at least one child node 230), these values 231 are intermediate values 231 used to compute the final expanded ciphertext (i.e., the sequence of encrypted integers 210). The values 231 associated with each node 230 will be stored in the two-dimensional array res. In particular, res[i][j] refers to the value associated with the leftmost jth node at the ith level. The innermost loop computes the values 231 for the two child nodes 230 of the jth leftmost node 230 of the ith level. The parent refers to the value of this jth leftmost node of the ith level. Left and right, in some examples, refer to additional intermediate values 231 used to compute the final values 231 for the left and right child node value 231 respectively (which will be stored in res[i][j] and res[i][j+$2^i$], respectively). In some implementations (e.g., when the server 111 is memory-constrained), the intermediate values 231 are deleted after use in a loop to preserve memory. For example, after computing the values for level i, the algorithm 240 of FIG. 2B no longer needs the values 231 for levels 0, 1, . . . , i−1 and these values 231 may be deleted.

In a typical binary tree, nodes 230 are typically placed in consecutive indices. However, in some examples, the expander 200 does not places the nodes 230 in consecutive indices. The Sum function of the algorithm 240 uses the pK to correctly add two ciphertexts that have been substituted with different powers. After both loops complete, the leaf nodes 230 (i.e., the top level of the tree 220) include the sequence of encrypted integers 210. In the example shown, the leaf nodes 230 are divided by the degree d prior to return the sequence of encrypted integers 210. Alternatively, the polynomial 172, prior to encryption, may be divided by the degree d. In this instance, smaller parameters (e.g., noise) could be selected to decrease bandwidth consumed on communication between the user device 10 and the server 111 at the cost of additional computation by the user device 10.

Referring back to FIG. 1, the server 111, based on the sequence of encrypted integers 210, returns an encrypted result 192 to the user device 10. For example, the server 111 may execute a calculator 190 that receives the encrypted integers 210 and retrieves data blocks from the untrusted data store 150 using the encrypted integers. For instance, the calculator 190 calculates the encrypted result 192 based on data blocks 152 retrieved from the untrusted data store 150 and the sequence of encrypted integers 210.

Figure 3:
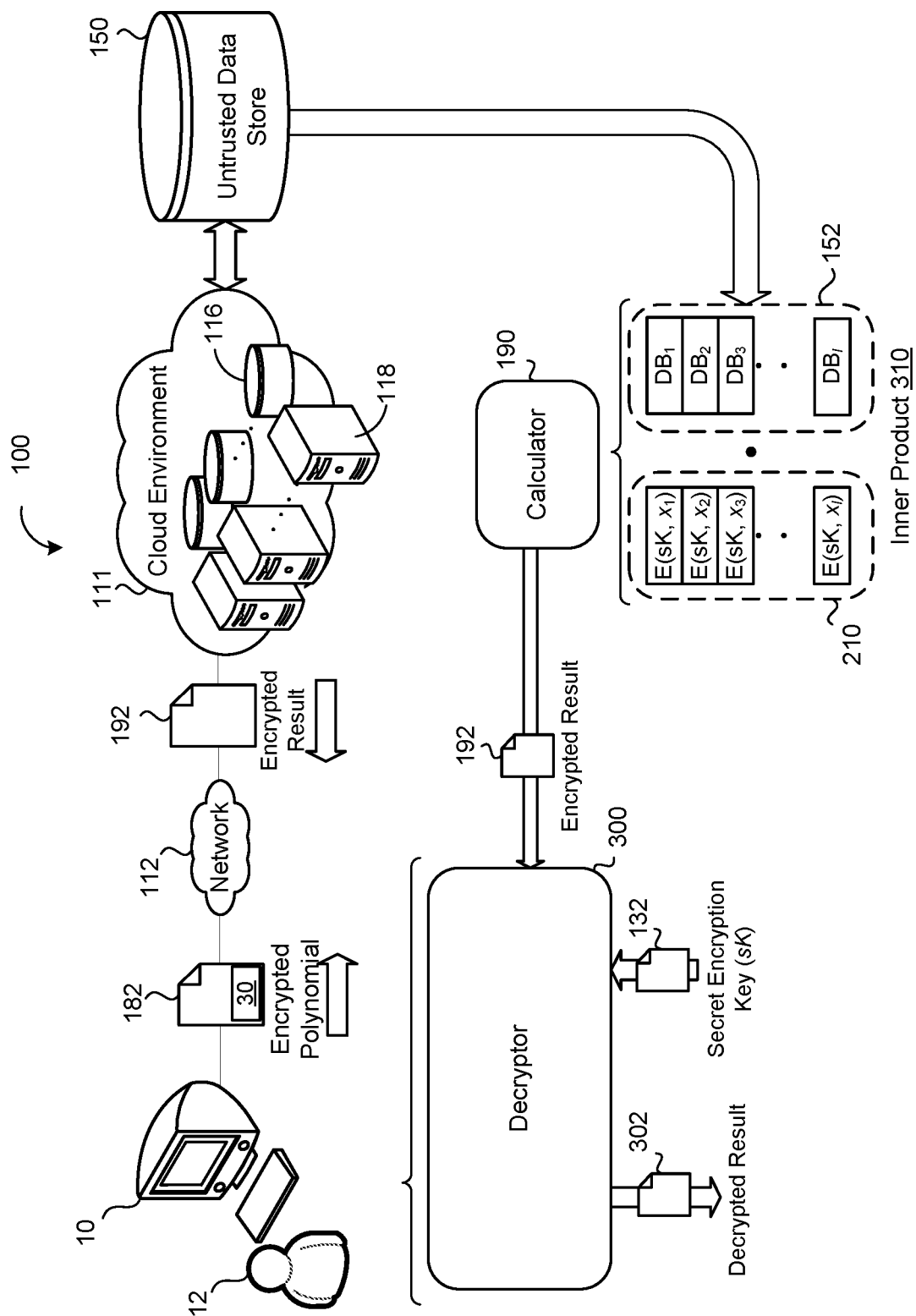
FIG. 3 is a schematic view of a decryptor of the system of FIG. 1.

Referring now to FIG. 3, in some examples, the calculator 190 calculates the encrypted result 192 by determining an inner product 310 (also known as dot product or scalar product) of the sequence of encrypted integers 210 and data blocks 152 retrieved from the untrusted data store 150. The encrypted result 192 may include the inner product 310. In some implementations, the user device 10 receives the encrypted result 192 from the server 111 and executes (i.e., via the data processing hardware 124) a decryptor 300 for decrypting the encrypted result 192 using the sK 132. The sK 132 may be stored on the local memory hardware 122 and the decryptor 300 may obtain the sK 132 for decrypting the encrypted result 192. Accordingly, the decryptor 300 outputs a decrypted result 302 that represents a result that would be obtained by calculating the inner product 310 of the plaintext query 134 with the data blocks 152, however the retrieval was oblivious. The decrypted result 302 may correspond to any number of data blocks 152 depending on the query 134 (or queries) sent to the server 111.

Figure 4:
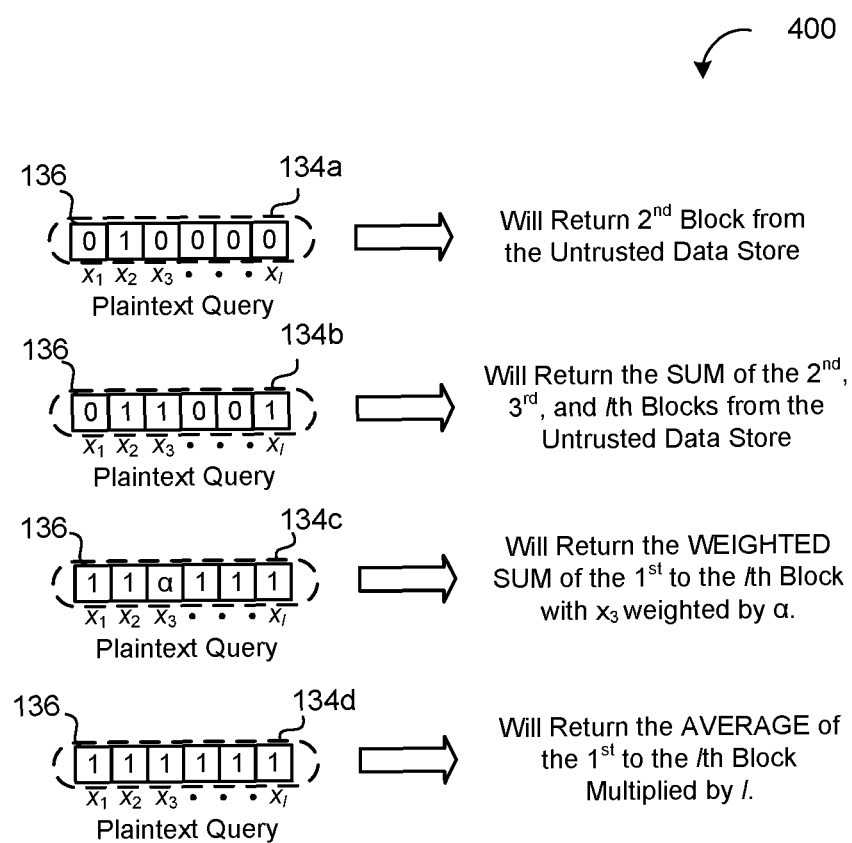
FIG. 4 is a schematic view of sample selection queries that select which data blocks to download from the distributed system.

Referring now to the schematic view 400 of FIG. 4, in some examples, each plaintext integer 136 in the plaintext query 134 corresponds to selection criteria for a respective data block 152 of the untrusted data store 150. The plaintext query 134 may include a selection vector for selecting a single data block 152 from the untrusted data store 150. For example, a first plaintext query 134a input to the compressor 160 may include a vector of all zeros except for a single one (1) at the 2nd position. Here, the decryptor 300 will decrypt an encrypted result 192 returned from the first query 134a into a decrypted result 302 that includes the data block 152 corresponding to the 2nd position of the untrusted data store 150, as the inner product 310 would multiply all data blocks 152 with a zero except for the 2nd data block. As the data blocks 152 multiplied by zeros will drop out, summing will result in only the 2nd data block 152 remaining. Clearly, such a query 134a may be used to select any data block 152 from any position/location of the data store 150 obliviously. However, a variety of other functions may also be performed by the query 134.

The compress algorithm executed by the compressor 160 extends beyond receiving merely selection vectors, but includes receiving general vectors (i.e., vectors where each integer 136 may include any integer in the plaintext space). That is, while typical PIR schemes require a separate selection vector to be sent to the server 111 for each data block 152 to retrieve (each selection vector having a length equal to the number n of data blocks), the compressor 160 may compress d encryptions into a single general vector. For example, a second query 134b input to the compressor 160 sets three integers 136 equal to one (1) (i.e., the 2nd, the 3rd, and the lth integers 136) while the remaining integers 136 are set equal to zero. Here, the second query 134b will return a corresponding encrypted result 192 that corresponds to a sum of the values of the 2nd, 3rd, and lth data blocks 152 of the untrusted data store 150. The query 134 may also retrieve a weighted sum. For example, a third query 134c input to the compressor 160 sets all integers 136 equal to one (1) except for the 3rd integer 136 which is set to a weighting factor of α. Accordingly, the third query 134c will return a corresponding encrypted result 192 that corresponds to the weighted sum (i.e., the 3rd data block will be weighted by a while the remaining data blocks 152 will be weighted by one). In yet another example, the server 111 may return an average of multiple data blocks 152 in response to a fourth query 134d input to the compressor 160 that sets all integers 136 equal to one (1). Thus, it is understood that the compressor 160 provides compression on a general vector (as opposed to only a selection vector) where the integers 136 may span over an entire plaintext space.

In some implementations, the system 100 allocates computation and/or communication between offline and online periods. An offline period is defined as a time period where resources (e.g., bandwidth, computation, power, etc.) are comparatively cheaper than during an online period. That is, during the offline period, there is less contention for resources than during the online period. For example, the user device 10 (FIG. 1) may be connected to WiFi during the night (offline period), making bandwidth comparatively cheap to using mobile data during the day (online period). Because of the multiplicative factor caused by the expansion overhead (which may be an up to four to five times increase in some applications), oblivious retrieval has a considerable cost (i.e., resource usage) increase over ordinary plaintext retrieval. Therefore, it is advantageous to leverage the cost differential between online and offline periods. Thus, the system 100 may conduct offline calculations in order to reduce the cost (i.e., reduce consumed resources) during an online period when an oblivious query 134 of the untrusted data store 150 is desired by shifting the expansion overhead to the offline period.

Figure 5A:
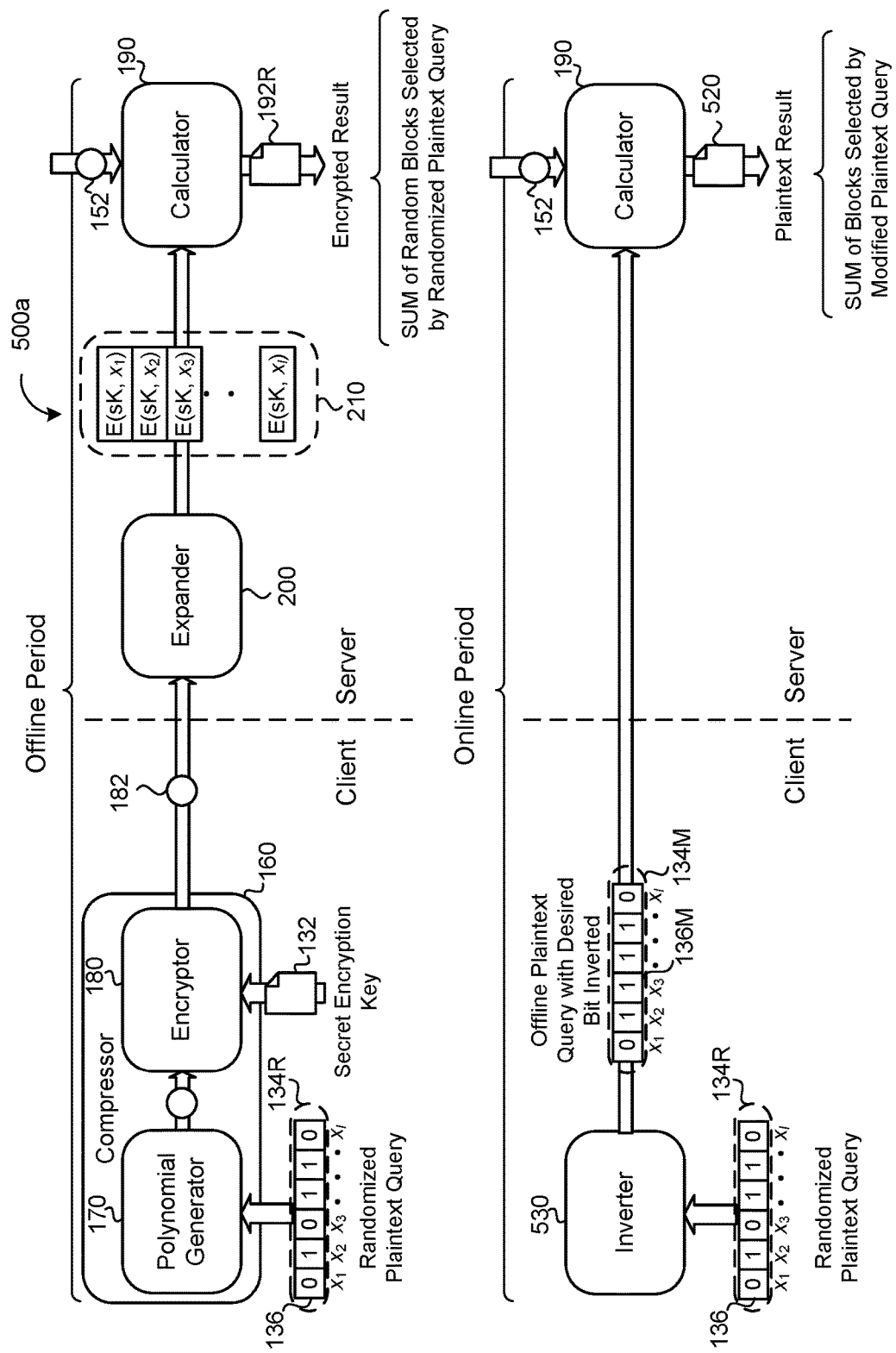
FIGS. 5A and 5B are schematic views of the system of FIG. 1 performing online and offline calculations.

Referring now to FIG. 5A, during the offline period, schematic view 500a shows the compressor 160 receiving a randomized plaintext query 134R. The randomized plaintext query 134R randomizes (e.g., by the data processing hardware 124) the setting of each integer 136 equal to zero or one (1). In the example shown, the 2nd, 4th, and 5th integers 136 are set equal to one (1), while the remaining integers 136 are set equal to zero. As described previously, the query 134R will cause the server 111 to return an encrypted result 192R that will be the sum of the data blocks 152 associated with the integers 136 in the randomized plaintext query 134R set equal to one (1) (i.e., the 2nd, 4th, and 5th integers 136). As the query 134R was conducted during an offline period, the cost of retrieving the corresponding encrypted result 192R is comparatively low. The user device 10 may store (i.e., in the local memory hardware 122) the encrypted result 192R and the randomized plaintext query 134R until the user 12 conducts a query 134 during an online period.

In some examples, when the user 12 conducts a query 134 during the online period, an inverter 530 executing on the data processing hardware 124 inverts a single plaintext integer (i.e., a select integer 136M) of the randomized plaintext query 134R to form a modified query 134M. That is, when the selected integer 136M of the randomized plaintext query 134R is set equal to zero, the inverter 530 changes the selected integer 136M from zero to one (1). On the other hand, when the selected integer 136M of the randomized plaintext query 134R is set equal to one (1), the inverter 530 changes the selected integer 136M from one (1) to zero. The inverted integer 136M (e.g., the 3rd integer 136 in FIG. 5A) of the modified query 134M corresponds to the data block 152 that the user 12 wants to retrieve from the untrusted data store 150 during the online period. Here, the inverter 530 sends the modified query 134M to the expander 200 of the server 111 in the clear (i.e., in plaintext). That is, the encryptor 180 does not encrypt the modified query 134M. Because the modified query 134M is not encrypted, it is a binary vector the size of the number n of data blocks 152 in the data store 150 and has no expansion overhead due to the encryption. Thus, the bandwidth consumed by the modified query 134M is considerably less than the bandwidth consumed by, for example, the encrypted polynomial 182. Because the modified query 134M is not compressed and therefore does not require expansion (thus greatly reducing computation required by the server 111), the calculator 190 of the server 111 receives the modified query 134M directly and calculates a plaintext result 520. That is, the calculation (e.g., the dot product) between the modified query 134M and the data blocks 152 includes the plaintext result 520 equal to the sum of the data blocks 152 selected by the modified query 134M. The server 111 may provide the plaintext result 520 to the user device 10.

Figure 5B:
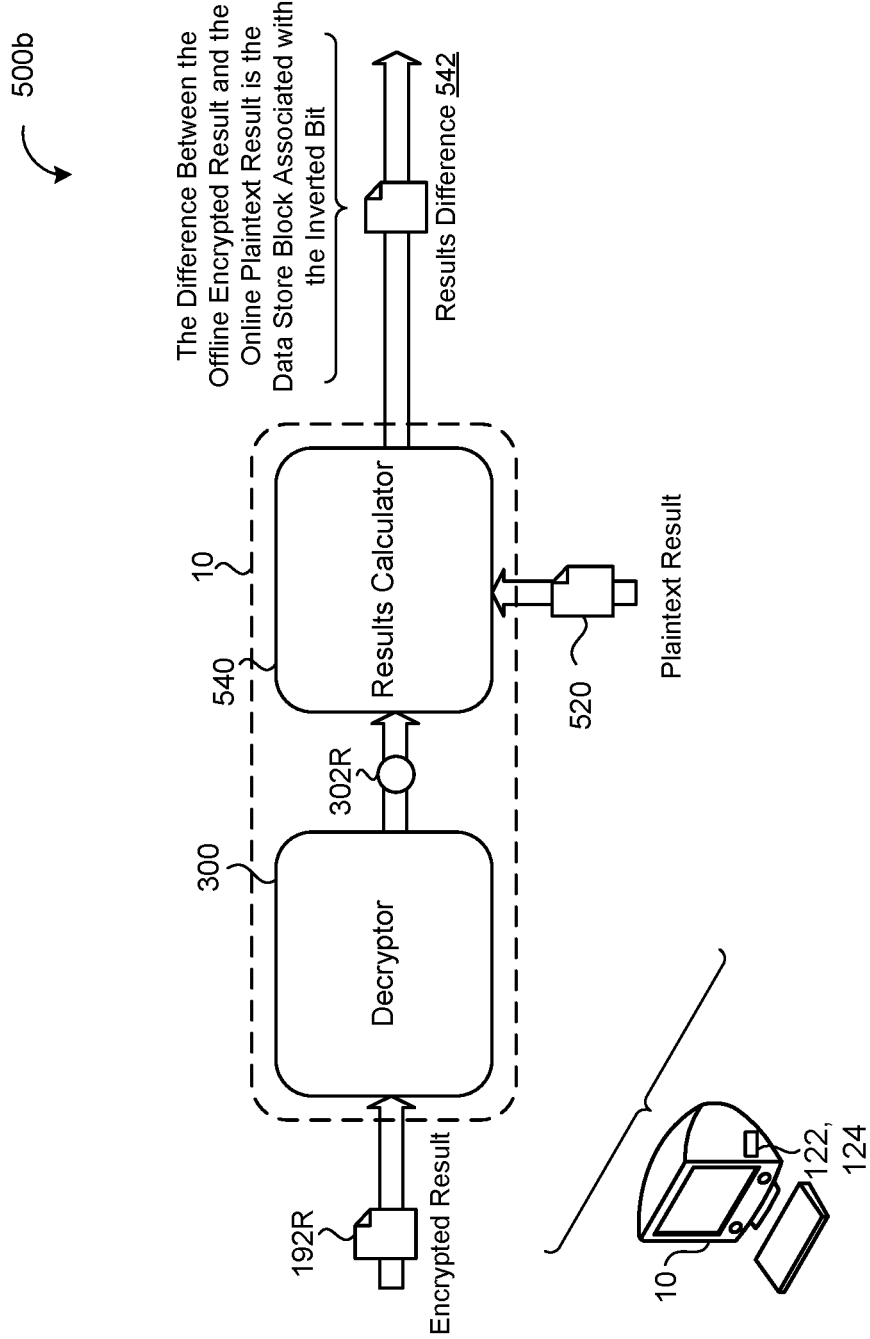

Referring now to the schematic view 500b of FIG. 5B, in some examples, the user device 10 (i.e., via the data processing hardware 124) executes the decryptor 300 to decrypt the previously stored encrypted result 192R into a corresponding decrypted result 302R. Here, the previously stored encrypted result 192R corresponds to the randomized plaintext query 134R conducted during the offline period, as discussed above with reference to FIG. 5A. In these examples, the data processing hardware 124 further executes a results calculator 540 configured to calculate a results difference 542 between the plaintext results 520 received from the server 111 and the decrypted result 302R output from the decryptor 300.

Because the data blocks 152 retrieved in response to the queries 134R, 134M differ by only the single inverted integer 136M, the results difference 542 corresponds to the value associated with the inverted integer 136M. Thus, the user device 10 has retrieved the data block 152 using minimal resources during an online period without the server 111 determining which data block 152 was retrieved from the untrusted data store 150. The encryption of the randomized query 134R assures that the server 111 cannot determine which integer 136 has been inverted between the randomized query 134R and the modified query 134M. Because the modified query 134M was modified from the randomized query 134R, the server determines no information from the modified query 134M alone despite the query 134M being sent to the server 111 in the clear, i.e., as plaintext. However, it should be noted that the randomized query 134R and the encrypted results 192R should not be reused in order to maintain privacy, as reuse allows the server 111 to determine differences between the modified queries 134M. In some examples, the user device 10 retrieves multiple encrypted results 192R from independent randomized queries 134R in order to build a "pool" of encrypted results 192R and randomized queries 134R to use while in an online period. In some implementations, the randomized query 134R includes randomized integers sampled from the plaintext space instead of a randomized bit vector. While this increases computation, this ensures that data blocks 152 other than the retrieved data block 152 remain hidden from the client 12 (i.e., the inner product 310 does not reveal additional information about the data blocks 152 to the client 12). This may be advantageous when the untrusted data store 150 is private.

Figure 6:
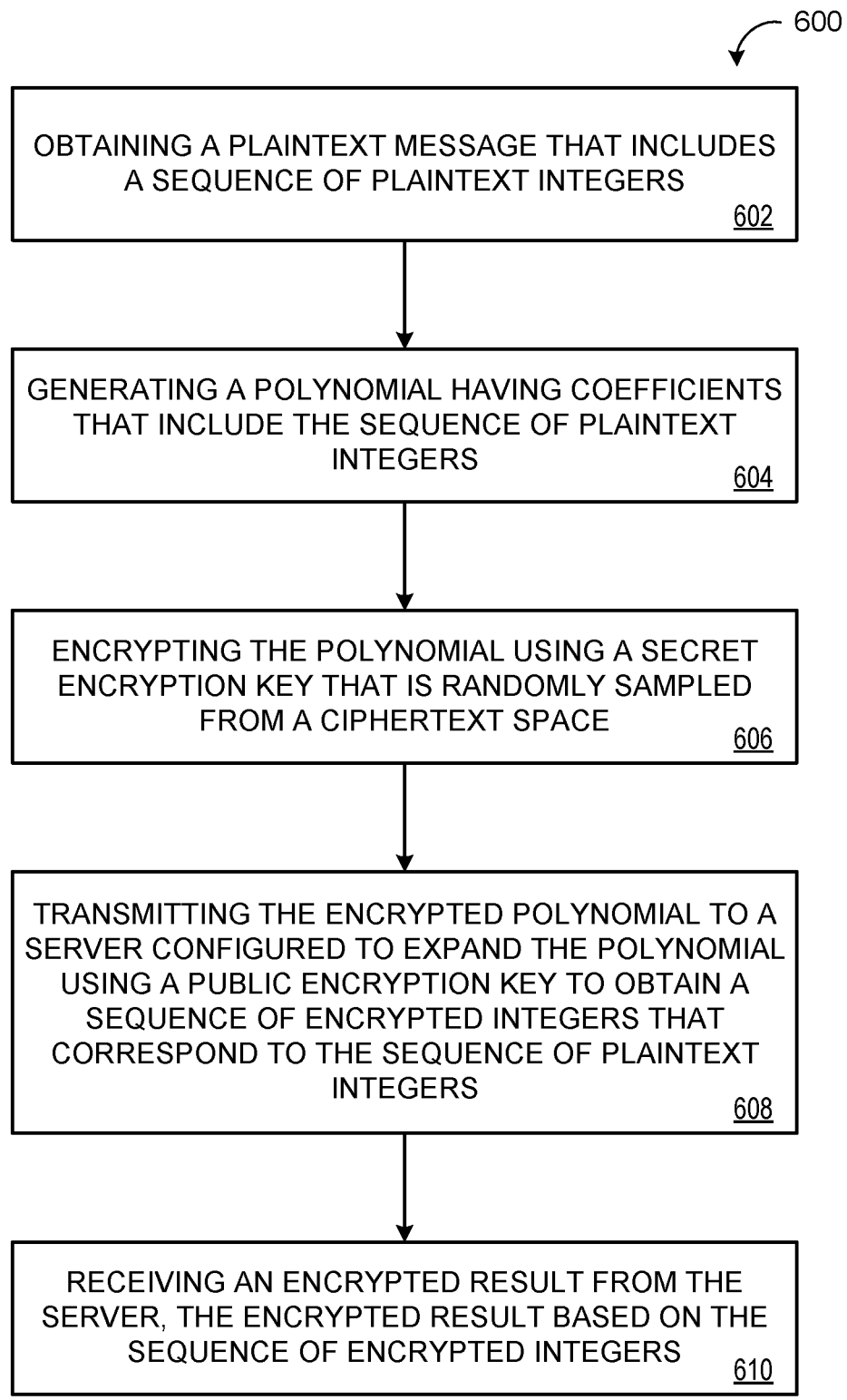
FIG. 6 is a flowchart of an example arrangement of operations for a method of compressing and expanding queries when obliviously retrieving a data block from an untrusted storage device using private information retrieval.

FIG. 6 is a flowchart of an example method 600 for compressing a query to retrieve encrypted results obliviously from a server. The method 600 starts at operation 602 with obtaining, at data processing hardware 124 of a user device 10, a plaintext query 134. The query 134 includes a sequence of plaintext integers 136. At operation 604, the method 600 includes generating, by the data processing hardware 124, a polynomial 172 with coefficients 173. The coefficients 173 include the sequence of plaintext integers 136. At operation 606, the method 600 includes encrypting, by the data processing hardware 124, the polynomial 172 using a secret encryption key 132. The secret encryption key 132 is randomly sampled by the data processing hardware 124 from a ciphertext space.

At operation 608, the method 600 includes transmitting, by the data processing hardware 124, the encrypted polynomial 182 to a server 111 in communication with the data processing hardware 124. The server 111 is configured to expand the encrypted polynomial 182 using a public encryption key 130 to obtain a sequence of encrypted integers 210. The sequence of encrypted integers 210 correspond to the sequence of plaintext integers 136 of the plaintext query 134. The method 600, at step 610, includes receiving, at the data processing hardware 124, an encrypted result 192 from the server 111. The encrypted result 192 is based on the sequence of encrypted integers 210. In some implementations, the method 600 includes calculating the encrypted result 192 based on an untrusted data store 150 (e.g., a database) stored on the server 111 and the sequence of encrypted integers 210, and returning the encrypted result 192 to the user device 10. For example, the server 111 may calculate the encrypted result 192 by determining an inner product 310 of the database 150 stored on the server 111 and the sequence of encrypted integers 210.

Figure 7:
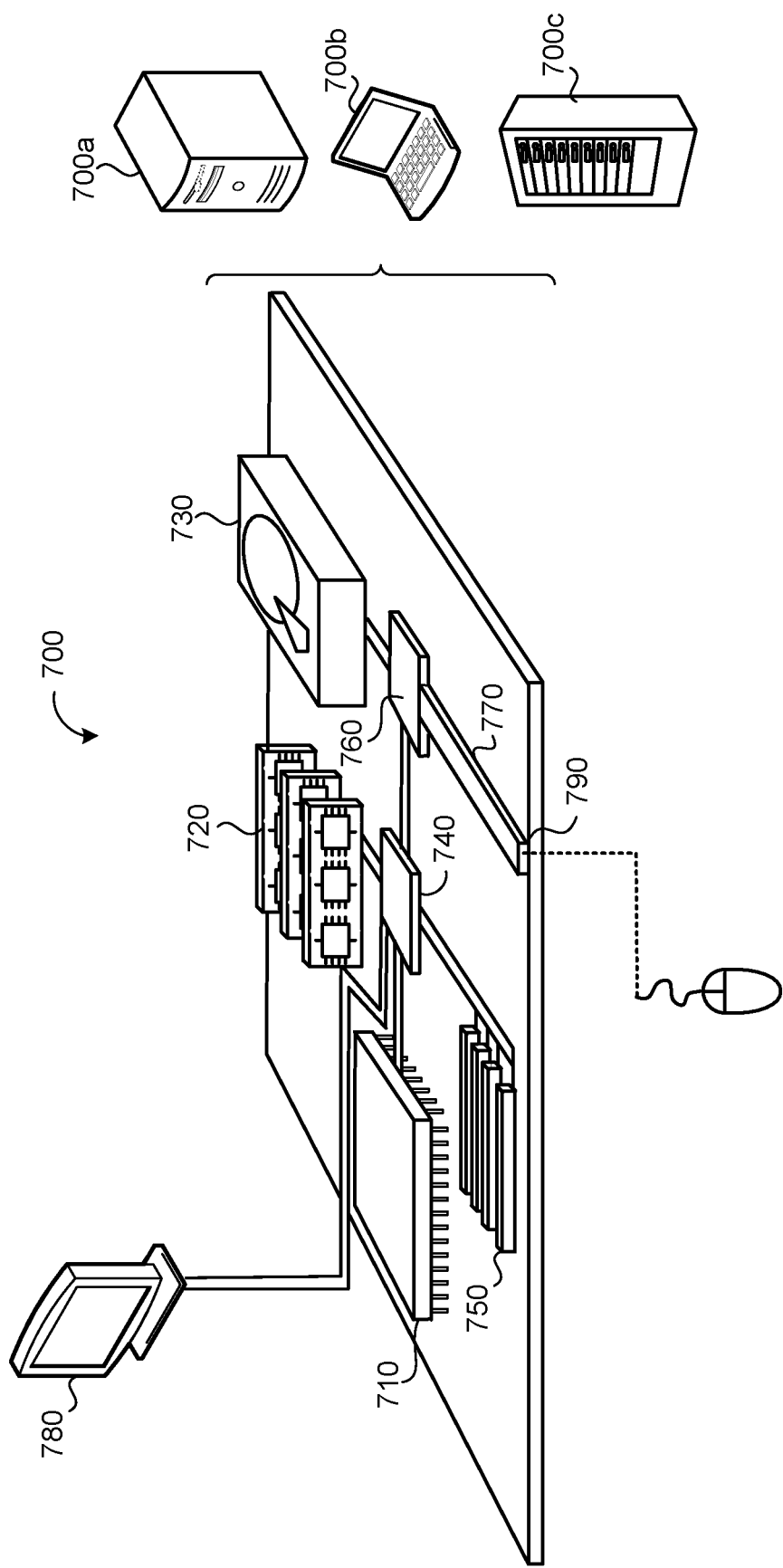
FIG. 7 is a schematic view of an example computing device that may be used to implement the systems and methods described herein.

FIG. 7 is schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
obtaining, at data processing hardware of a user device, a plaintext query by generating a randomized query comprising a sequence of plaintext integers;
generating, by the data processing hardware, a polynomial having coefficients, the coefficients comprising the sequence of plaintext integers of the plaintext query;
encrypting, by the data processing hardware, the polynomial using a secret encryption key, the secret encryption key randomly sampled by the data processing hardware from a ciphertext space;
transmitting, by the data processing hardware, the encrypted polynomial to a server in communication with the data processing hardware, the server configured to expand the encrypted polynomial using a public encryption key to obtain a sequence of encrypted integers, the sequence of encrypted integers corresponding to the sequence of plaintext integers of the plaintext query;
receiving, at the data processing hardware, an encrypted result from the server, the encrypted result based on the sequence of encrypted integers;
inverting, by the data processing hardware, a selected plaintext integer from the sequence of plaintext integers of the randomized query to form a modified query, the selected plaintext integer associated with a respective data block of an untrusted data store of the server;
transmitting, by the data processing hardware, the modified query to the server, the server configured to:
calculate an unencrypted result based on the untrusted data store the server and the modified query; and
return the unencrypted result to the user device; and
after receiving the encrypted result and the unencrypted result from the server, calculating, by the data processing hardware, a difference between the encrypted result and the unencrypted result to obtain a value for the respective data block of the untrusted data store that is associated with the selected plaintext integer from the sequence of plaintext integers of the randomized query.

2. The method of claim 1, wherein the server is configured to expand the encrypted polynomial by generating a tree data structure, the encrypted polynomial comprising a root of the tree data structure.

3. The method of claim 2, wherein a top row of the tree data structure comprises the sequence of encrypted integers.

4. The method of claim 1, wherein encrypting the polynomial comprises encrypting the polynomial with a fully homomorphic encryption scheme.

5. The method of claim 1, wherein the server is configured to, after expanding the encrypted polynomial using the public encryption key:
calculate the encrypted result based on an untrusted data store at the server and the sequence of encrypted integers; and
return the encrypted result to the user device.

6. The method of claim 5, wherein the server is configured to calculate the encrypted result by determining an inner product of the untrusted data store and the sequence of encrypted integers.

7. The method of claim 5, further comprising, after receiving the encrypted result from the server, decrypting, by the data processing hardware, the encrypted result to obtain a decrypted result, the decrypted result corresponding to at least one data block of the untrusted data store.

8. The method of claim 1, wherein each plaintext integer in the sequence of plaintext integers of the plaintext query corresponds to selection criteria for a respective data block of an untrusted data store at the server.

9. A system comprising:
data processing hardware; and
memory hardware in communication with the data processing hardware, the memory hardware storing instructions that when executed on the data processing hardware cause the data processing hardware to perform operations comprising:
obtaining a plaintext query by generating a randomized query comprising a sequence of plaintext integers;

generating a polynomial having coefficients, the coefficients comprising the sequence of plaintext integers of the plaintext query;

encrypting the polynomial using a secret encryption key, the secret encryption key randomly sampled by the data processing hardware from a ciphertext space;

transmitting the encrypted polynomial to a server in communication with the data processing hardware, the server configured to expand the encrypted polynomial using a public encryption key to obtain a sequence of encrypted integers, the sequence of encrypted integers corresponding to the sequence of plaintext integers of the plaintext query;

receiving an encrypted result from the server, the encrypted result based on the sequence of encrypted integers;

inverting a selected plaintext integer from the sequence of plaintext integers of the randomized query to form a modified query, the selected plaintext integer associated with a respective data block of an untrusted data store at the server;

transmitting the modified query to the server, the server configured to:
calculate an unencrypted result based on the untrusted data store at the server and the modified query; and
return the unencrypted result to the system; and after receiving the encrypted result and the unencrypted result from the server, calculating a difference between the encrypted result and the unencrypted result to obtain a value for the respective data block of the untrusted data store that is associated with the selected plaintext integer from the sequence of plaintext integers of the randomized query.

10. The system of claim 9, wherein the server is configured to expand the encrypted polynomial by generating a tree data structure, the encrypted polynomial comprising a root of the tree data structure.

11. The system of claim 10, wherein a top row of the tree data structure comprises the sequence of encrypted integers.

12. The system of claim 9, wherein encrypting the polynomial comprises encrypting the polynomial with a fully homomorphic encryption scheme.

13. The system of claim 9, wherein the server is configured to, after expanding the encrypted polynomial using the public encryption key:
calculate the encrypted result based on an untrusted data store at the server and the sequence of encrypted integers; and
return the encrypted result to the system.

14. The system of claim 13, wherein the server is configured to calculate the encrypted result by determining an inner product of the untrusted data store at the server and the sequence of encrypted integers.

15. The system of claim 13, wherein the operations further comprise, after receiving the encrypted result from the server, decrypting the encrypted result to obtain a decrypted result, the decrypted result corresponding to at least one data block of the untrusted data store at the server.

16. The system of claim 9, wherein each plaintext integer in the sequence of plaintext integers of the plaintext query corresponds to selection criteria for a respective data block of an untrusted data store at the server.

* * * * *